3,144,490
HYDROGENATION OF ALDEHYDES AT ENHANCED RATE USING PLATINUM AND RUTHENIUM CATALYSTS

Paul N. Rylander and Jay G. Kaplan, Newark, N.J., assignors to Engelhard Industries, Inc., Newark, N.J., a corporation of Delaware
No Drawing. Filed Oct. 31, 1960, Ser. No. 65,931
5 Claims. (Cl. 260—618)

This invention relates to a hydrogenation of aldehydes and more particularly to a process for the hydrogenation of aldehydes in the presence of a platinum or ruthenium catalyst characterized by a considerably enhanced hydrogenation rate.

One difficulty encountered in the past in the catalytic hydrogenation of aldehydes to alcohols has been the considerable reduction in activity of the catalyst during the hydrogenation. Platinum and ruthenium catalysts for example, have their catalytic activity reduced to a low order during the hydrogenation of the aldehydes, and hence production of the desired hydrogenation products such as alcohol is considerably lowered.

In accordance with the present invention, it has been found that the activity of the platinum or ruthenium catalyst can be maintained at a high level during the entirety of the hydrogenation, and hence the hydrogenation rate can be maintained at a high level during the entirety of the hydrogenation, by a process involving treating the aldehyde with hydrogenation containing a small amount of elemental oxygen admixed therewith, broadly from about 0.1 percent–5 volume percent of the gases present.

It was unexpected and surprising that the presence of the elemental oxygen admixed with the hydrogen resulted in the Ru and Pt catalysts effecting hydrogenation of the aldehyde at a hydrogenation rate maintained at a high level throughout the entire process, for the reasons that (1) Rh and Pd catalysts were not similarly improved for the same hydrogenation reactions, and (2) $O_2$ has harmful, or at least no beneficial effects on a variety of other hydrogenations employing Ru and Pt catalysts.

The preferred amount of elemental oxygen is from about 0.5 percent–3.0 percent. The reaction temperatures may be from about 10° C.–250° C., preferably from about 25° C.–100° C., the pressure may be from about atmospheric to about 1,000 p.s.i.g., with advantages in lower cost for lower pressure operation, and the process may be batch or continuous.

The catalytically active metal concentration may be from about 0.01–10 percent by weight, preferably from about 0.1–5.0 percent by weight. The catalytically active metal is preferably supported on a carrier, which may be in the form of powder, extrudate, pellets or granules. Useful carriers include alkaline earth carbonates, e.g. calcium carbonate; oxides, e.g. zinc oxide; insoluble sulfates, e.g. barium sulfate; carbon; alumina; and silica.

Aldehydes which are hydrogenated in accordance with the present invention include aliphatic and aromatic aldehydes. In general, the aldehydes hydrogenated in accordance with the invention are those represented by the general formula

wherein R is $C_1$–$C_{18}$ alkyl or an aromatic radical. Examples of such aldehydes include acetaldehyde, propionaldehyde, n-butyraldehyde, isobutyraldehyde, n-valeraldehyde, n-capronaldehyde, n-heptaldehyde, n-octyl aldehyde, nonyl aldehyde, n-decyl aldehyde, undecylenic aldehyde, lauryl aldehyde, and the higher aliphatic aldehydes, benzaldehyde, toluylaldehyde, piperonal, naphthaldehyde, methoxybenzaldehyde, and other substituted aromatic aldehydes.

The invention will be further illustrated by reference to the following examples.

EXAMPLE I

A series of catalytic hydrogenation experiments for heptaldehyde at ambient temperature and one atmosphere pressure were performed to find the effect of the presence of $O_2$ in the $H_2$ gas. In each case 40 ml. of water, 50 ml. of $C_2H_5OH$, 10 ml. of heptaldehyde, and the specified amount of catalyst were charged to a one-liter, heavy-wall Erlenmeyer flask and the flask then placed in a shaker. The flask was capped and connected to a water filled gas burette system. The system was then evacuated, filled with $N_2$, evacuated again, again filled with $N_2$, and finally evacuated and filled with $H_2$. In the case of the Ru catalyst, the catalyst was pre-hydrogenated by treatment with hydrogen gas, i.e. the solvent and catalyst were shaken for one hour at room temperature and normal pressure with $H_2$ before the substrate was added; following this the flask was evacuated, the heptaldehyde placed in the flask and the same procedure of evacuation and gas addition previously described used before the hydrogenation run. Shaking was performed at the rate of 280 strokes per minute and a stroke amplitude of 2.5 inches.

Three catalysts were compared according to this procedure: (1) 1,000 mg. of 5 percent Ru on carbon catalyst, (2) 1,000 mg. of 5 percent Pt on carbon catalyst, and (3) 59.7 mg. of $PtO_2$ catalyst. In each case the catalyst was equivalent to 50 mg. of metal. Two runs were made on each of these catalysts as follows: A. a control run in contact with $H_2$ as previously described, and B. a run in which 2 percent of $O_2$ (added as 10 percent air) was present in the $H_2$ added to the catalyst.

The following Table I shows milliliters of $H_2$ absorbed up to various periods following initiation of the hydrogenation.

Table I

[Ml. OF $H_2$ ABSORBED AFTER MINUTES AS INDICATED]

| Run No. | 10 minutes | 40 minutes | 80 minutes | 160 minutes | 280 minutes |
|---|---|---|---|---|---|
| 1A | 200 | 600 | 825 | 1,110 | 1,330 |
| 1B | 280 | 750 | 1,100 | 1,325 | 1,530 |
| 2A | 50 | 175 | 325 | 475 | 735 |
| 2B | 65 | 225 | 420 | 625 | 1,000 |
| 3A | 15 | 35 | 40 | 60 | 85 |
| 3B | 15 | 50 | 60 | 90 | 130 |

Table I shows clearly: (1) superiority of heptaldehyde hydrogenation rate for carrier-based Pt and Ru catalysts to $PtO_2$ catalysts, (2) superiority of Ru on carbon catalyst to Pt on carbon catalyst, and (3) the superiority in all cases of hydrogenations of the heptaldehyde with the 2 percent $O_2$ in $H_2$ to hydrogenations without the $O_2$ present. It was observed that very little of the $H_2$ consumption is due to reaction with $O_2$ where added $O_2$ is present; the $O_2$ concentration actually increases as the reaction proceeds.

A similar series of experiments was made using 3 percent $O_2$ (added as air) with satisfactory results. Two other series using 1 percent $O_2$ and 0.5 percent $O_2$ gave results close to those using 2 percent, with 1 percent being slightly better than 0.5 percent $O_2$ and 2.0 percent $O_2$.

EXAMPLE II

The beneficial effect of oxygen is not general. A series of experiments using 5 percent Pt/C with 0.0 percent, 0.5 percent and 1.0 percent $O_2$ in hydrogen were made with octene-1, 1-nitropropane, benzaldehyde, cyclohexanone and heptaldehyde substrates. Only with benzaldehyde and heptaldehyde was there an improvement by the presence of oxygen. These further experiments were performed with the same apparatus as described in Example I. In each case 40 ml. of water, 50 ml. of ethanol and 10 ml. of substrate were used. A zero order rate of hydrogenation (expressed as milliliters of $H_2$ absorbed per minute) was determined for different $O_2$ increments as shown in the following Table II.

Table II

[HYDROGENATION WITH 5% PT/C]

| Substrate | Grams of Catalyst | 0.0% $O_2$ | 0.5% $O_2$ | 1.0% $O_2$ |
|---|---|---|---|---|
| Octene-1 | 0.25 | 40 | 27 | 27 |
| 1-nitropropane | 0.25 | 25 | 18 | 15 |
| Benzaldehyde | 0.50 | 12 | 14 | 14 |
| Cyclohexanone | 1.00 | 25 | 25 | 25 |
| Heptaldehyde | 1.00 | 3.0 | 3.5 | 4 |

It is seen in Table II that oxygen caused a definite decrease in rate when the substrate was an olefin or a nitroparaffin, and it was without effect when the substrate was a ketone.

EXAMPLE III

Experiments were run also with 5 percent Ru on carbon catalyst to show the effect of addition of $O_2$ to the $H_2$ on corresponding reactions. Conditions were the same as shown previously and results are given in the following Table III.

Table III

[HYDROGENATION WITH 5% RU/C]

| Substrate | Grams of Catalyst | 0.0% $O_2$ | 0.5% $O_2$ | 1.0% $O_2$ |
|---|---|---|---|---|
| Octene-1 | 0.25 | 40 | 28 | 1 |
| 1-nitropropane | 0.25 | 5 | 4 | 2.4 |
| Cyclohexanone | 0.25 | 25 | 25 | 25 |
| Heptaldehyde | 1.00 | 62 minutes | | 40 minutes |

In Table III octene-1, 1-nitropropane, and cyclohexanone gave nearly zero order reactions and the rate is expressed in ml. $H_2$ absorbed/minute. Heptaldehyde gave a decreased time requirement for reaction with the hydrogen in the presence of the 1.0% $O_2$; the time in minutes for 50 percent completion is given in the table. As with platinum, oxygen adversely effects the rate with olefins and nitroparaffins, has no effect with ketones, and improves the rate with aldhydes.

It will be obvious to those skilled in the art that many modifications may be made within the scope of the present invention without departing from the spirit thereof, and the invention includes all such modifications.

What is claimed is:

1. A process for hydrogenating aldehydes to produce alcohols, which comprises reacting the aldehyde with hydrogen containing a small amount of elemental oxygen admixed therewith in the presence of a catalyst of the group consisting of Ru and Pt at a reaction temperature thereby to produce the corresponding alcohol.

2. A process in accordance with claim 1 wherein the hydrogen contains from about 0.1 percent–5 percent of elemental oxygen admixed therewith.

3. A process in accordance with claim 1 wherein the reaction temperature is from about 20°–250° C.

4. A process in accordance with claim 1 wherein the catalyst comprises a carrier having Ru as catalyst supported thereon.

5. A process for hydrogenating aldehydes to produce alcohol, which comprises reacting an aldehyde having the general formula

wherein R is of the group consisting of $C_1$–$C_{13}$ alkyl radicals and an aromatic radical, with hydrogen containing a small amount of elemental oxygen admixed therewith in the presence of a catalyst comprising a carrier having a catalytically active metal of the group consisting of Ru and Pt supported thereon, at reaction temperature thereby to produce the corresponding alcohol.

References Cited in the file of this patent

UNITED STATES PATENTS

| 1,403,794 | Lichtenhahn | Jan. 17, 1922 |
| 2,517,916 | Pavlic | Aug. 8, 1950 |

OTHER REFERENCES

Carothers et al.: Jour. Amer. Chem. Soc., 45: 1071–86 (1923) (16 pages).